(12) United States Patent
Mayer

(10) Patent No.: US 9,388,734 B2
(45) Date of Patent: Jul. 12, 2016

(54) RESTORING UNIT, PARTICULARLY FOR AN INTERNAL COMBUSTION ENGINE

(71) Applicant: Mahle International GmbH, Stuttgart (DE)

(72) Inventor: Burkhardt Mayer, Waiblingen (DE)

(73) Assignee: Mahle International GmbH (DE)

(*) Notice: Subject to any disclaimer, the term of this patent is extended or adjusted under 35 U.S.C. 154(b) by 0 days.

(21) Appl. No.: 14/763,163

(22) PCT Filed: Jan. 22, 2014

(86) PCT No.: PCT/EP2014/051235
§ 371 (c)(1),
(2) Date: Jul. 23, 2015

(87) PCT Pub. No.: WO2014/114667
PCT Pub. Date: Jul. 31, 2014

(65) Prior Publication Data
US 2015/0369121 A1    Dec. 24, 2015

(30) Foreign Application Priority Data

Jan. 24, 2013 (DE) .......................... 10 2013 201 170

(51) Int. Cl.
*F02B 37/18* (2006.01)
*F02D 9/10* (2006.01)
(Continued)

(52) U.S. Cl.
CPC ............ *F02B 37/186* (2013.01); *F02D 9/1065* (2013.01); *F16K 1/16* (2013.01);
(Continued)

(58) Field of Classification Search
CPC ..... F02D 11/02; F02D 11/105; F02D 11/107; F02D 2011/108; F02D 2009/0277; F02D 2009/0255; F02D 2200/0404; F02D 9/00; F02D 9/02; F16K 31/047; F16K 1/32; F16K 1/16; F02B 37/186

USPC ............ 123/396, 397, 398, 399, 400; 251/69, 251/129.12, 305, 337
See application file for complete search history.

(56) References Cited

U.S. PATENT DOCUMENTS 4,582,653 A * 4/1986 Blanchard .............. F02M 19/12
123/198 D
4,867,122 A * 9/1989 Kono ..................... B60K 31/08
123/396

(Continued)

FOREIGN PATENT DOCUMENTS

DE          10037461        2/2002
DE          10037461 A1     2/2002
(Continued)

OTHER PUBLICATIONS

English abstract provided for DE-10037461.
(Continued)

*Primary Examiner* — Stephen K Cronin
*Assistant Examiner* — Xiao Mo
(74) *Attorney, Agent, or Firm* — Fishman Stewart PLLC

(57) ABSTRACT

A restoring unit for an internal combustion engine may include a restoring console including a substantially cylindrical bearing dome. A first bearing unit may include a first receiving opening. The bearing dome may be rotatably inserted into the first receiving opening about an axis of the restoring console. A spring element may be arranged at least partially on an outer circumferential face of the bearing dome, and the restoring console may be preloaded via the spring element against the first bearing unit. The bearing dome may be detachably arranged in the first receiving opening via a clip connection. The clip connection may include a radial through-slot disposed on a first face side of the bearing dome facing the first receiving opening. The bearing dome may have a console bearing face mounting the restoring console within the first bearing unit.

20 Claims, 3 Drawing Sheets

(51) Int. Cl.
  *F16K 1/16* (2006.01)
  *F16K 1/32* (2006.01)
  *F16K 31/04* (2006.01)
  *F02D 9/02* (2006.01)

(52) U.S. Cl.
  CPC ............... *F16K 1/32* (2013.01); *F16K 31/047* (2013.01); *F02D 2009/0269* (2013.01); *F02D 2009/0277* (2013.01); *Y10T 137/6031* (2015.04)

(56) References Cited

U.S. PATENT DOCUMENTS

| | | | | |
|---|---|---|---|---|
| 4,880,207 | A * | 11/1989 | Matsumoto | F02D 9/02 251/305 |
| 5,048,485 | A * | 9/1991 | Terazawa | F02D 11/107 123/399 |
| 5,121,727 | A * | 6/1992 | Kramer | F02D 11/107 123/337 |
| 5,265,572 | A * | 11/1993 | Kadomukai | F02D 11/10 123/396 |
| 5,368,283 | A | 11/1994 | Pavlin | |
| 5,429,090 | A * | 7/1995 | Kotchi | F02D 9/02 123/396 |
| 5,762,044 | A * | 6/1998 | Hollister | F02D 9/02 123/400 |
| 5,829,409 | A * | 11/1998 | Saito | F02D 9/02 123/396 |
| 5,996,551 | A * | 12/1999 | Schroder | F02D 9/02 123/337 |
| 6,263,898 | B1 * | 7/2001 | Vanderveen | F02D 9/02 137/15.25 |
| 6,276,664 | B1 | 8/2001 | Keller | |
| 6,647,960 | B2 * | 11/2003 | Rauch | F16K 31/043 123/399 |
| 6,745,994 | B2 * | 6/2004 | Klug | F02D 9/10 137/65 |
| 6,840,217 | B2 * | 1/2005 | Meiwes | F02D 9/1065 123/396 |
| 6,918,374 | B1 * | 7/2005 | Kurita | F02D 9/02 123/337 |
| 6,918,401 | B1 * | 7/2005 | Vanderveen | F02D 9/1065 137/15.25 |
| 2001/0000574 | A1 * | 5/2001 | Wayama | F02D 9/1065 123/337 |
| 2001/0035508 | A1 | 11/2001 | Xia | |
| 2001/0045203 | A1 * | 11/2001 | Arsic | F02D 11/10 123/399 |
| 2002/0125456 | A1 | 9/2002 | Rauch et al. | |

FOREIGN PATENT DOCUMENTS

| | | |
|---|---|---|
| DE | 10043001 A1 | 3/2002 |
| DE | 10209052 A1 | 10/2002 |
| DE | 60006905 T2 | 10/2004 |
| DE | 102010020579 A1 | 11/2011 |

OTHER PUBLICATIONS

English abstract for DE-10043001.
German Search Report for DE-102013201170.9, mailed Jun. 17, 2013.
English abstract for DE-10037461.
English Abstract for DE 102010020579.

* cited by examiner

RESTORING UNIT, PARTICULARLY FOR AN INTERNAL COMBUSTION ENGINE

CROSS-REFERENCE TO RELATED APPLICATIONS

This application claims priority to German Patent Application No. 10 2013 201 170.9 filed Jan. 24, 2013, and International Patent Application No. PCT/EP2014/051235, filed Jan. 22, 2014, both of which are hereby incorporated by reference in their entirety.

TECHNICAL FIELD

The present invention relates to a restoring unit, particularly for an internal combustion engine of a motor vehicle, and an internal combustion engine with such a restoring unit.

BACKGROUND

Conventional restoring units are used for example in intake devices of internal combustion engines for motor vehicles or in exhaust gas turbochargers of motor vehicles, if an intake opening or a wastegate bypass in the exhaust gas turbocharger is to be optionally opened or closed by means of a rotatable valve. Such a valve device can be actuated by means of a drive unit, for example an electric motor or similar. For the case where the drive unit is not active, it is frequently desirable that the valve of the valve device is moved automatically into a predetermined position, in which the intake device or respectively the bypass valve is, for example, closed. For example, in this way, in the sense of the so-called "fail-safe" principle, it can be prevented that the valve of the valve device assumes an undefined state in the case of a malfunction or a failure of the drive unit.

DE 10 2010 020 579 A1 describes a pneumatic adjustment element with a housing, the internal volume of which is divided by a membrane into a first and second chamber. The membranes are fixed in position radially externally and are fixed in position internally on an axially movable tappet guided in the housing. The tappet is axially displaceable in the case of an unequal pressure between the two chambers. In one of the two chambers, a spring element is arranged in axial direction of the tappet and is supported on both sides. This spring element serves for the restoring of the tappet into a predetermined initial position.

SUMMARY

The present invention is concerned with the problem of indicating an improved embodiment for a restoring unit, which is distinguished by a simple mechanical structure, in particular with a small number of components.

This problem is solved by the subject of the independent claims. Preferred embodiments are the subject of the dependent claims.

The basic idea of the invention, accordingly, is to construct a restoring unit of the type named in the introduction from only three components. The restoring unit according to the invention comprises a restoring console, which has a substantially cylindrical bearing dome. Furthermore, the restoring unit comprises as second component a first bearing unit, which has a first receiving opening, into which the bearing dome is rotatably insertable or inserted. Finally, the restoring unit comprises as third component a spring element, which is arranged at least partially on an outer circumferential face of the bearing dome and which preloads the restoring console against the first bearing unit.

As will be explained in further detail below, a valve device, for example of an intake module of an internal combustion engine, can be mounted in a torque-proof manner on the bearing dome, so that the valve device can be rotated by a rotating of the restoring console including the bearing dome. In this way, an effective opening cross-section of an intake opening, which is able to be closed by the valve device, can be adjusted.

For the rotating of the bearing dome, the latter can be in drive connection for example with the drive unit. For this, for example, a drive shaft of the electric motor can be connected in a torque-proof manner with the bearing dome of the restoring console.

For the case where no torque is exerted onto the restoring console by the drive unit, the restoring console is in a first predetermined position owing to the preloading generated by the spring element. By means of a mechanical stop provided at a suitable location on the bearing unit, the restoring console can therefore be held in the first predetermined position in a simple manner, when the restoring console is pressed by means of the spring element against this stop which is provided on the bearing unit.

Preferably, this first predetermined position can correspond, at the same time, to a position of the valve mounted on the bearing dome, in which this completely closes an intake opening of the intake module. This means that by means of the restoring unit according to the invention, such an intake device is closed automatically for example in the case of failure of the actuator. Therefore, it is prevented that the restoring console is situated in an undefined position in the case of a failure of the actuator.

For the rotating of the restoring console away from the first predetermined position, a drive torque can be generated by means of the drive unit, counteracting the elastic force of the spring element. Depending on the extent of the torque applied by the drive unit, therefore an (equilibrium) position of the restoring console, differing from the first predetermined position, can be set. In the case of a systematic disconnection of the drive unit or respectively in the case of a functional disorder of the drive unit and a disappearance of the drive torque connected therewith, the restoring console is automatically moved back again into the first predetermined position owing to the preloading of the spring element.

As the restoring unit according to the invention is composed substantially of only three different components, namely restoring console, bearing unit and spring element, it can be produced in a simple and therefore cost-efficient manner. Owing to the small number of components, the restoring unit according to the invention has, in addition, a particularly high degree of operational reliability and is therefore particularly suited for use in an internal combustion engine or in an exhaust gas turbocharger of a motor vehicle. The bearing dome of the restoring console is insertable or inserted detachably into the first receiving opening by means of a clip connection. This enables a particularly simple mounting of the restoring unit, after the spring element is placed or respectively has been placed onto the bearing dome of the restoring console. The use of a clip connection enables a mechanically stable fixing of the restoring console on the bearing unit with respect to an axial direction of the bearing dome, wherein the connection, as required, can be detached again for example for maintenance purposes or similar, in a simple manner. For this, the clip connection of the restoring unit according to the invention has movable elements on one of the two join partners, and a mount on the other join partner. Preferably here the movable element is arranged on the restoring console and the mount is arranged on the first bearing unit. The mount can be constructed as a shoulder, which is embraced by the movable element preferably in axial and radial direction.

The clip connection furthermore comprises a radial through-slot, which is provided on a first face side of the bearing dome facing the first receiving opening. By means of such a radial through-slot, the clip connection can be realized in a particularly simple manner.

The bearing dome of the restoring console according to the invention has, in addition to the outer circumferential face, a console bearing face. The console bearing face can adjoin the outer circumferential face here directly or indirectly in axial direction. Said console bearing face can form here a surface shell of a cylinder with a circular cross-section. The outer circumferential face can likewise surround a cylinder with a circular cross-section. Alternatively thereto, the outer circumferential face can also, however, surround a cylinder with a polygonal cross-section, in particular with a pentagonal or hexagonal cross-section. By means of the console bearing face, the restoring console according to the invention is mounted rotatably within the first receiving opening of the first bearing unit.

In a preferred embodiment, in the mounted state of the restoring console, the first bearing unit is arranged between the clip connection and the spring element. Furthermore, the spring element is preloaded in axial direction by compression, wherein both axial ends of the spring element lie against the adjacent components. Therefore, the restoring console is held by the spring element in axial direction free of play in the first bearing unit.

According to a further advantageous embodiment of the invention, the through-slot is arranged in the region of the console bearing face. Therefore, the bearing region of the restoring console forms the fastening region at the same time.

In a further development of the invention, a stop, constructed in an annular shape, is arranged between the console bearing face and the outer circumferential face, which stop delimits the penetration of the bearing dome into the first receiving opening. Therefore, the restoring console can not be inserted too deeply into the receiving opening, whereby damage of the spring element is prevented. The stop is arranged here so that the elastic elements of the clip connection can spring into the arresting position. Preferably, the axial length of the console bearing face, between the stop and the movable part of the clip connection, is somewhat greater than the axial length of the first receiving opening. Therefore, the restoring console can be pressed somewhat further into the receiving opening, whereby the movable part of the clip connection is able to engage securely on the counter-piece.

In an advantageous further development, the through-slot can comprise a detent element, in particular a detent nose, for the detachable fastening of the restoring console in the first receiving opening. By means of such a detent nose, the restoring console, if necessary, can be detached again from the bearing unit in a particularly simple manner.

For the use of the restoring unit according to the invention in an internal combustion engine or in an exhaust gas turbocharger, for example in order to open or respectively close an intake opening of an intake module of the internal combustion engine or a bypass duct of a wastegate arrangement by means of a valve mechanism, a rotary shaft through-opening can be provided in the bearing dome, into which a rotary shaft is able to be received or is received at least partially and rotatably for the torque-proof connecting of the restoring console with a valve device. Preferably, the rotary shaft through-opening extends in an axial direction of the bearing dome.

A rotary shaft can be inserted in a form-fitting manner into the rotary shaft through-opening and connected in a torque-proof manner with the restoring console. A rotating of the restoring console or respectively of the bearing dome then automatically also results in a corresponding rotary movement of a valve which is connected with the rotary shaft. Preferably, the valve device is connected by means of the rotary shaft such that the valve device completely closes the opening of the intake module, when the restoring console is situated in the first predetermined position.

In an embodiment which is able to be produced in a particularly simple and therefore cost-efficient manner, the rotary shaft through-opening can be constructed as an inner square opening. Of course, however, other geometric configurations are also conceivable, which permit a torque-proof fastening of the rotary shaft on the bearing dome.

In order to apply the restoring force necessary for the preloading of the restoring console against the first bearing unit, the spring element can be constructed as an elastic torsion spring, which in a mounted state in the restoring unit can rest with a first end section on a first stop section provided on the first bearing unit and with a second end section on a second stop provided on the bearing dome. In order to prevent an undesired movement of the torsion spring along the axial direction of the bearing dome, a receiving groove can be provided on the first bearing unit, into which receiving groove the first end section of the torsion spring is able to be, or is, received at least partially for axial fixing.

In a particularly preferred embodiment, the second stop can be constructed as an extension projecting from the bearing dome in the axial direction of the restoring console. This enables a particularly simple mounting of the spring element or respectively of the spring-elastic torsion spring on the bearing dome. For this, the spring element must merely be placed onto the bearing dome and the second end section of the torsion spring must be brought to lie against the extension projecting from the bearing dome. On inserting of the bearing dome into the receiving opening of the bearing unit, the first end section of the torsion spring is pressed into the receiving groove and in this way the preloading according to the invention onto the restoring console is produced.

In a further embodiment, a protective wall can be provided on the first bearing unit, which protective wall, in a mounted state of the restoring unit in an internal combustion engine, acts for this as a catching device for parts falling from the restoring unit in the case of a functional disorder. It can in this way, for the case where parts of the restoring unit falling from the restoring unit due to a fault leads to damage of the intake module using the restoring unit or respectively of the internal combustion engine using this intake module.

In a further embodiment, the restoring unit can also have a second, additional bearing unit, which supplements the bearing unit to a bearing assembly and which has a second receiving opening for receiving the bearing dome. According to this embodiment, the bearing dome, in a mounted state in the region of its first face side is inserted into the first receiving opening of the bearing unit. In the region of its second face side, the bearing dome is inserted into the second receiving opening, so that the bearing dome is fixed between the first and second bearing unit forming the bearing assembly. In this case, the provision of a clip connection or similar for fastening the bearing dome in the first receiving opening is not absolutely necessary. The two bearing units can be connected with one another for example by means of a suitable snap connection in a mechanically stable manner, but detachably if necessary. By means of the provision of a second, additional bearing unit, the bearing dome can be held in a particularly mechanically stable manner. The possibility presents itself here that the rotary shaft for the torque-proof connecting of the restoring console with the valve connection is inserted into the rotary shaft through-opening in the region of the second bearing unit, i.e. on the second face side of the bearing dome.

The invention furthermore relates to an internal combustion engine for a motor vehicle with an intake device for the intake of air into a combustion chamber of the internal combustion engine and with a restoring unit with one or more of the previously mentioned features. In the internal combustion engine, a valve device is connected in a torque-proof manner with the bearing dome of the restoring unit, wherein by means of the valve device an intake opening of the intake device is able to be switched between an open and a closed state.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are represented in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
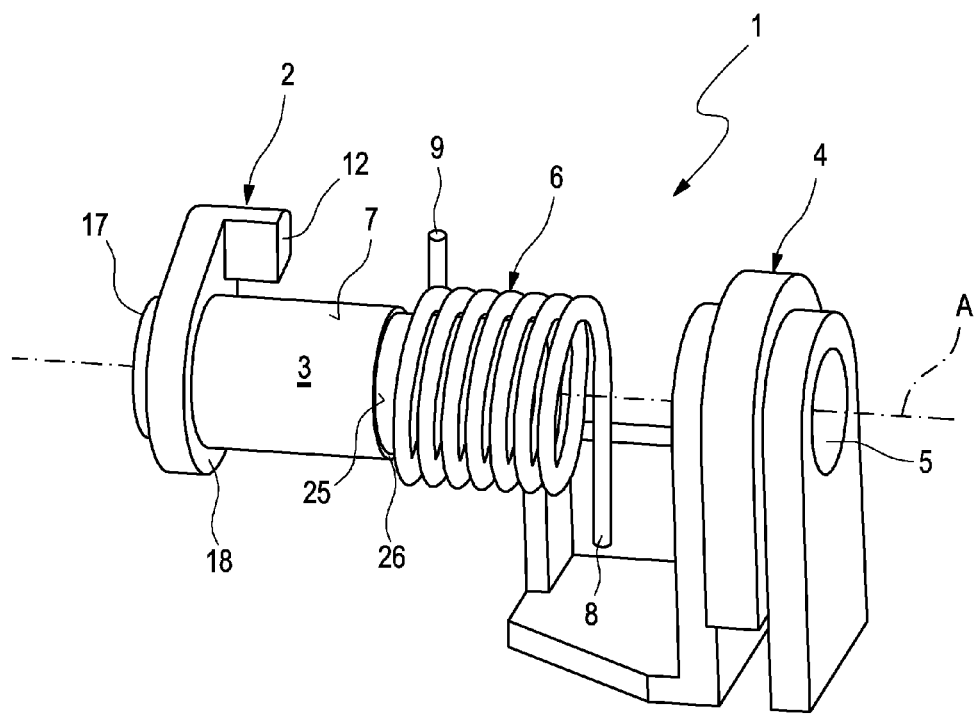
FIG. 1 a restoring unit according to the invention, in a non-mounted state.
Figure 2:
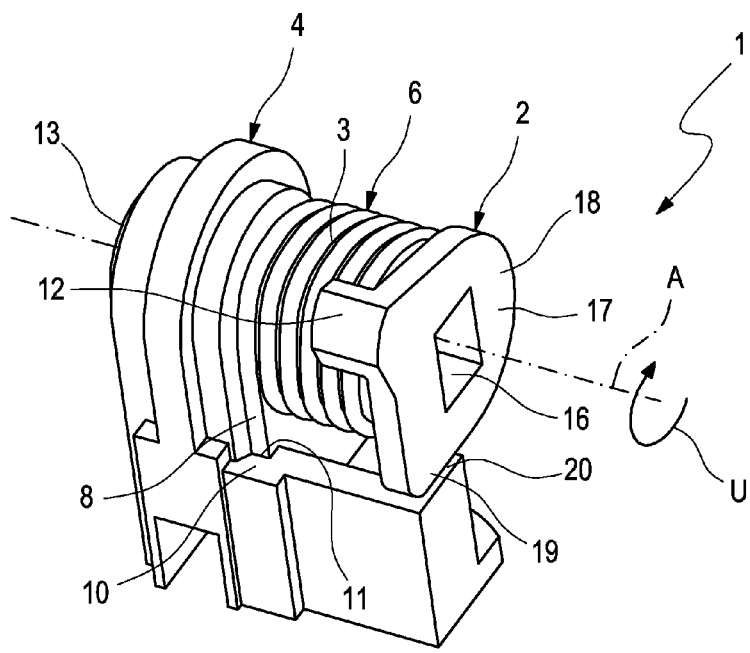
FIG. 2 the restoring unit according to the invention, in a mounted state.

In FIG. 1, a restoring unit according to the invention is illustrated in a non-mounted state and is designated by 1. FIG. 2 shows the restoring unit 2 in a mounted state.

Figure 4:
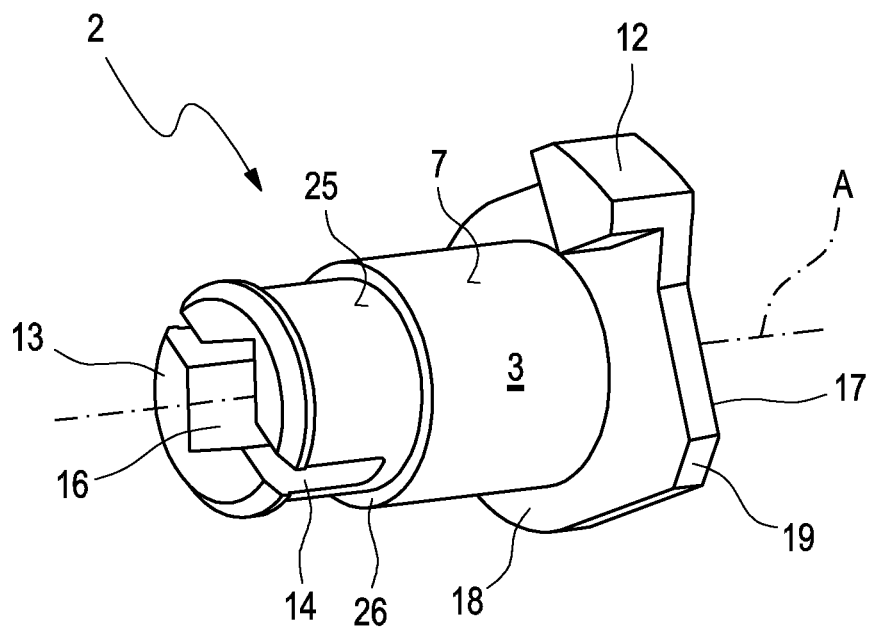
FIG. 4 a detail illustration of the restoring console.

The restoring unit 1 comprises a restoring console 2 with a substantially cylindrical bearing dome 3. In FIG. 4, the restoring console 2 is illustrated as a separate component. The restoring unit 1 furthermore comprises a first bearing unit 4, which has a first receiving opening 5, into which the bearing dome 3 is inserted rotatably about an axial axis A. The restoring unit 1 also comprises a spring element 6, which is arranged at least partially on an outer circumferential face 7 of the bearing dome 3. The spring element 6 can be constructed as a spring-elastic torsion spring with a first end section 8 and with a second end section 9.

Figure 3:
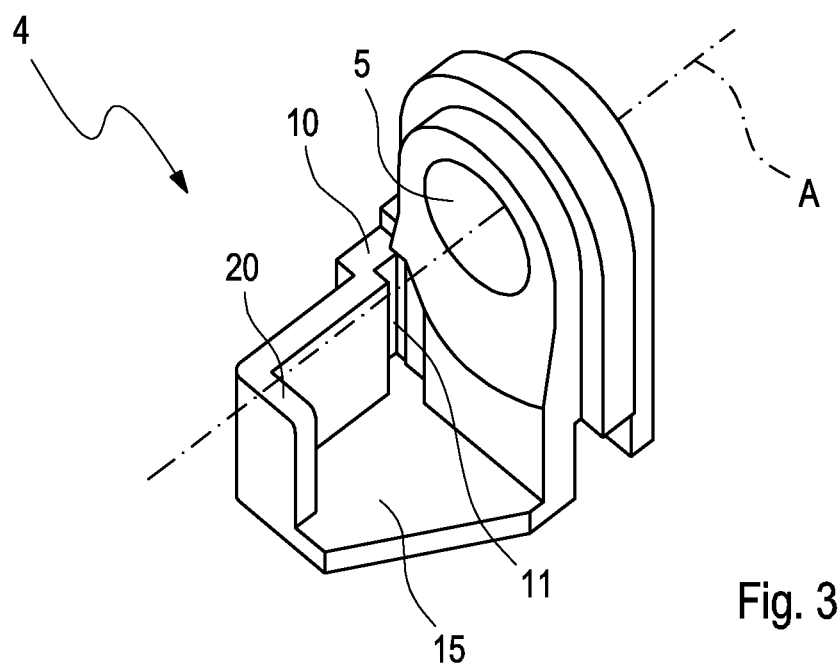
FIG. 3 a detail illustration of the bearing unit.

In the mounted state, the torsion spring can rest with the first end section 8 in radial direction on a first stop 10 provided on the first bearing unit 4. On the first stop 10 of the first bearing unit 4 a receiving groove 11 can be provided, into which the first end section 8 of the torsion spring can be received for axial fixing, which is shown in the illustration of FIG. 3. The torsion spring can rest with the second end section 9 on a second stop 12 provided on the bearing dome 3 (cf. FIG. 1).

Observing the illustration of FIG. 4, it is seen that on a first face side 13 of the bearing dome 3, facing the first receiving opening 5 in the mounted state, a radial through-slot 14 can be provided. The radial through-slot 14 can form a detent element, in particular a detent nose, by means of which the restoring console 2 can be fastened detachably in the first receiving opening 5 of the first bearing unit 4. In this case, the through-slot 14 and the first receiving opening 5 form a type of clip connection.

The restoring console has a region, constructed as console bearing face 25, which is constructed substantially cylindrically. Furthermore, a stop 26, which is constructed as an annular step, is arranged between the console bearing face 25 and the bearing dome 3.

In the example scenario of the figures, the axial length of the console bearing face 25 is slightly greater than the axial extent of the first receiving opening 5. In this way, the restoring console 2 can be securely inserted into the receiving opening 5 and engaged on the first bearing unit 4.

From the illustration of FIG. 3, it can further be seen that the first bearing unit 4 can comprise a protective wall 15, which in a mounted state of the restoring unit 1 in an internal combustion engine can act for this as a collecting device for parts falling from the restoring unit 1 in the case of a functional disorder. In this way, it is to be prevented that such parts can damage further components of the internal combustion engine.

Looking again now at the illustration of FIG. 2, it can be seen furthermore that a rotary shaft through-opening 16 can be provided on the bearing dome 3 of the restoring console 2, into which through-opening a rotary shaft (not shown in FIG. 2 for the sake of clarity) is able to be received at least partially and in a torque-proof manner for the torque-proof connecting of the restoring console 2 with a valve device. The rotary shaft through-opening 16 can be constructed as an inner square opening, as shown in FIG. 2. In variants, however, numerous other possibilities for technical realization are also conceivable, which enable a torque-proof fixing of the rotary shaft in the rotary shaft through-opening.

For the assembly of the restoring unit 1, firstly the spring element 6, which can be constructed as a torsion spring, is placed onto the bearing dome 3 of the restoring console 2. Subsequently, the restoring console 2 is mounted on the first bearing unit 4; for this, the bearing dome 3 is inserted into the first receiving opening 5 of the bearing unit 4. The bearing dome 3 can be rotatably fixed on the restoring console 2 in the manner of a clip connection by means of the radial through-slot 14 forming as detent element.

After the mounting, the torsion spring, which rests by means of the first end section 8 on the first stop 10 of the first bearing unit 4, and by means of the second end section 9, which rests on the second stop 12 of the restoring console 2, is preloaded.

In the mounted state of the restoring unit 1, shown in FIG. 2, the restoring console 2 is therefore preloaded against the first bearing unit 4 owing to the preloading force generated by the spring element 6. Without the action of an external torque, the restoring console 2 consequently remains in the position shown in FIG. 2.

A radial extension 18 can be provided on the bearing dome 3 in the region of a second face side 17. The radial extension 18 can, in turn, have a support section 19, which rests in the position of the restoring console 2 shown in FIG. 2 on a third stop 20 provided on the first bearing unit 4. By means of the spring element 6, the restoring console 2, with an external torque not being present, moves automatically back into the first position shown in FIG. 2 owing to the preloading force generated by the spring element 6.

By a suitable fastening of a valve device of an intake module of an internal combustion engine on the bearing dome 3 such that in the position of the restoring console shown in FIG. 2 the valve device closes an intake opening of the intake module, it can be ensured that the intake opening is automatically closed without the provision of an external torque on the restoring console 2. For opening the valve, the restoring console 2 can be rotated in a direction designated by U in FIG. 2 by the provision of an external torque. For this, the bearing dome 3 of the restoring console 2 can be in drive connection for example with an electric motor or with another suitable drive unit.

In the example of FIGS. 1 to 4, the two axial ends of the spring element 6 in mounted state rest on the first bearing unit 4 and on the second face side 17 of the restoring console 2, so that the spring element 6, with mounted restoring console 2, is slightly compressed. Therefore, the restoring console 2 is mounted in a manner free from play in axial direction.

Figure 5:
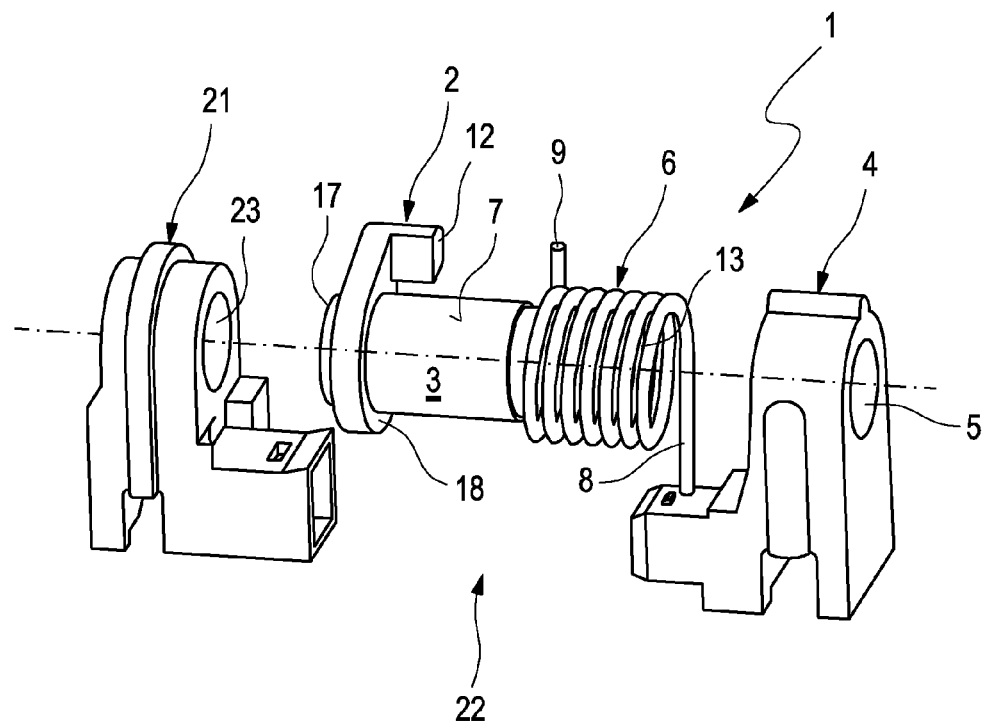
FIG. 5 a variant of the restoring unit of FIG. 1, in a non-mounted state.

In FIG. 5 a variant of the restoring unit 1 of FIGS. 1 to 4 is illustrated, by means of which the restoring unit 1 in addition to the first bearing unit 4 has a second bearing unit 21, which supplements the first bearing unit 4 to a bearing assembly 22. FIG. 5 shows the restoring unit 1 here in a non-mounted state, FIG. 6 in a mounted state, in which the spring element 6 preloads the restoring console 2 against the first bearing unit 4. The explanations concerning the console bearing face 25 and the stop 26 according to FIGS. 1 to 4 of course also apply to the variant according to FIGS. 4 and 5.

Figure 6:
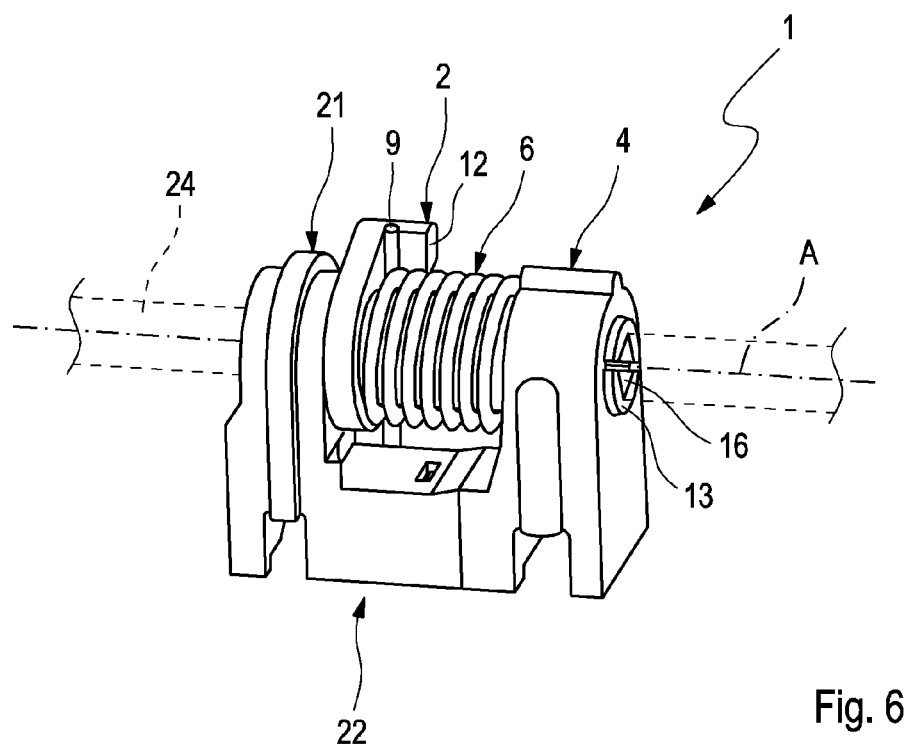
FIG. 6 the variant of FIG. 5, in a mounted state.

In the mounted state shown in FIG. 6, the bearing dome 3 in the region of its first face side 13 is inserted into the first receiving opening 5 of the first bearing unit 4 and in the region of its second face side 17 is inserted into a second receiving opening 23 provided in the second bearing unit 21.

The first and second receiving opening 5, 23 can be constructed as through-openings. In the mounted state shown in FIG. 6, the restoring console 2 is fixed with the bearing dome 3 between the two bearing units 4, 17 of the bearing assembly 22. A rotary shaft 24 can be inserted into the rotary shaft through-opening 16 either via the first face side 13 or via the second face side 17. As already explained, the valve of a valve device can be fastened on the rotary shaft 24, by means of which valve the valve device optionally opens or closes an intake opening of the intake module (not shown).

Also in the example of FIGS. 5 and 6, the axial ends of the spring element 6 rest in the mounted state on the first bearing unit 4 and on the second face side 17 of the restoring console 2, so that the spring element 6, with mounted restoring console 2, is slightly compressed. Therefore, the restoring console 2 is mounted free of play in axial direction.

The invention claimed is:

1. A restoring unit for an internal combustion engine of a motor vehicle, comprising:
    a restoring console including a substantially cylindrical bearing dome,
    a first bearing unit including a first receiving opening, wherein the bearing dome is rotatably inserted into the first receiving opening about an axis of the restoring console,
    a spring element arranged at least partially on an outer circumferential face of the bearing dome, wherein the restoring console is preloaded via the spring element against the first bearing unit,
    wherein the bearing dome is detachably arranged in the first receiving opening via a clip connection, and
    wherein the clip connection includes a radial through-slot disposed on a first face side of the bearing dome facing the first receiving opening, and wherein the bearing dome has a console bearing face extending at least partially in the circumferential direction, the console bearing facing mounting the restoring console within the first bearing unit.

2. The restoring unit according to claim 1, wherein the through-slot is arranged in a region of the console bearing face.

3. The restoring unit according to claim 1, wherein the bearing dome further includes a stop arranged between the console bearing face and the outer circumferential face, wherein the stop prevents further insertion of the bearing dome into the first receiving opening.

4. The restoring unit according to claim 1, wherein the through-slot includes a detent element on the first face side of the bearing dome for detachably securing the restoring console in the first receiving opening.

5. The restoring unit according to claim 1, wherein the bearing dome defines a rotary shaft through-opening configured to receive a rotary shaft in a torque-proof manner for a torque-proof connection of the restoring console with a valve device.

6. The restoring unit according to claim 5, wherein the rotary shaft through-opening defines an inner square opening.

7. The restoring unit according to claim 1, wherein the spring element is a spring-elastic torsion spring, wherein the spring-elastic torsion spring in a mounted state is supported with a first axial end section on a first stop disposed on the first bearing unit and is supported with a second axial end section on a second stop disposed on the bearing dome.

8. The restoring unit according to claim 7, wherein the first bearing unit further includes a receiving groove, and wherein the first axial end section of the torsion spring is at least partially arranged in the receiving groove in the mounted state for axially securing the torsion spring.

9. The restoring unit according to claim 7, wherein the second stop includes an extension projecting outwardly from the bearing dome in an axial direction of the restoring console.

10. The restoring unit according to claim 1, wherein the first bearing unit further includes a protective wall, wherein the protective wall in a mounted state defines a collecting device for retaining falling pieces.

11. The restoring unit according to claim 1, further comprising a second bearing unit disposed at a second face side of the bearing dome opposite the first bearing unit, the first bearing unit and the second bearing unit together defining a bearing assembly, wherein the second bearing unit includes a second receiving opening for receiving the bearing dome, and wherein the bearing dome in a mounted state has a first axial end section of the first face side arranged in the first receiving opening of the first bearing unit and a second face side of the second axial end section arranged in the second receiving opening of the second bearing unit.

12. An internal combustion engine for a motor vehicle, comprising:
    an intake device for air intake into a combustion chamber,
    a restoring unit integrated into the intake device, the restoring unit including:
        a restoring console including a substantially cylindrical bearing dome extending along an axis, the bearing dome including an outer circumferential face and a console bearing face extending at least partially in a circumferential direction;

a first bearing unit having a first receiving opening, wherein the console bearing face is rotatably inserted into the first receiving opening about the axis;

a spring element arranged at least partially on the outer circumferential face of the bearing dome, wherein the restoring console is preloaded via the spring element against the first bearing unit;

the bearing dome being detachably arranged in the first receiving opening via a clip connection;

wherein the clip connection includes a radial through-slot disposed in the console bearing face on a first face side of the bearing dome facing the receiving opening, and wherein the console bearing face mounts the restoring console within the first bearing unit in a mounted state; and a valve device connected in a torque-proof manner with the bearing dome of the restoring unit, wherein the valve device is switchable in an intake opening of the intake device between an opened state and a closed state.

13. The internal combustion engine according to claim 12, wherein the bearing dome further includes a stop arranged axially between the console bearing face and the outer circumferential face, wherein the stop prevents further insertion of the bearing dome into the first receiving opening.

14. The internal combustion engine according to claim 12, wherein the through-slot includes a detent element on the first face side of the bearing dome for detachably securing the restoring console in the first receiving opening.

15. The internal combustion engine according to claim 12, wherein the bearing dome has a rotary shaft through-opening configured to receive a rotary shaft of the valve device for a torque-proof connection of the restoring console with the valve device.

16. The internal combustion engine according to claim 15, wherein the rotary shaft through-opening defines a square cross-section.

17. The internal combustion engine according to claim 12, wherein the spring element is a spring-elastic torsion spring, wherein the torsion spring in the mounted state is supported with a first axial end section on a first stop disposed on the first bearing unit and with a second axial end section on a second stop disposed on the bearing dome.

18. The internal combustion engine according to claim 17, wherein the first bearing unit further includes a receiving groove, and wherein the first axial end section of the torsion spring is at least partially arranged in the receiving groove in the mounted state for axially securing the torsion spring.

19. The internal combustion engine according to claim 17, wherein the second stop of the bearing dome includes an extension projecting outwardly from the bearing dome in an axial direction.

20. The internal combustion engine according to claim 12, wherein the first bearing unit further includes a protective wall, and wherein the protective wall defines a collecting device for retaining falling pieces from the restoring unit in the mounted state.

* * * * *